(12) United States Patent
Meyers et al.

(10) Patent No.: US 7,436,079 B2
(45) Date of Patent: Oct. 14, 2008

(54) POWER SYSTEM FOR A TELECOMMUNICATIONS SITE

(75) Inventors: Jerry Meyers, Olathe, KS (US); Larry L. Johnson, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 119 days.

(21) Appl. No.: 11/567,451

(22) Filed: Dec. 6, 2006

(65) Prior Publication Data

US 2008/0093929 A1    Apr. 24, 2008

Related U.S. Application Data

(63) Continuation-in-part of application No. 11/132,013, filed on May 18, 2005.

(51) Int. Cl.
    *H02P 9/04*    (2006.01)
(52) U.S. Cl. .................. 290/1 A; 290/52; 307/64
(58) Field of Classification Search ........... 290/1 R, 290/1 A, 2, 52; 307/64; 322/7, 8
    See application file for complete search history.

(56) References Cited

U.S. PATENT DOCUMENTS

| | | | |
|---|---|---|---|
| 4,161,657 A | 7/1979 | Shaffer, Jr. | |
| 5,332,927 A | 7/1994 | Paul et al. | |
| 5,477,091 A | 12/1995 | Fiorina et al. | |
| 5,939,799 A | 8/1999 | Weinstein | |
| 5,994,795 A | 11/1999 | Gabillet | |
| 6,011,324 A | 1/2000 | Kohlstruck et al. | |
| 6,175,217 B1 | 1/2001 | Da Ponte et al. | |
| 6,184,593 B1 | 2/2001 | Jungreis | |
| 6,304,006 B1 | 10/2001 | Jungreis | |
| 6,498,462 B2 * | 12/2002 | Ballantine et al. | 322/8 |
| 6,503,649 B1 | 1/2003 | Czajkowski et al. | |
| 6,522,955 B1 | 2/2003 | Colborn | |
| 6,541,940 B1 | 4/2003 | Jungreis | |
| 6,559,551 B2 | 5/2003 | Graage et al. | |
| 6,615,118 B2 | 9/2003 | Kumar | |
| 6,630,750 B2 | 10/2003 | McAndrews | |
| 6,670,721 B2 | 12/2003 | Lof et al. | |
| 6,841,893 B2 | 1/2005 | Maiwald et al. | |
| 6,879,052 B1 | 4/2005 | Johnson | |
| 6,885,112 B2 | 4/2005 | Johnson | |
| 6,902,837 B2 | 6/2005 | McCluskey et al. | |
| 6,930,402 B1 | 8/2005 | Johnson et al. | |
| 6,960,838 B2 | 11/2005 | Johnson | |
| 6,992,401 B1 | 1/2006 | Johnson | |
| 7,000,395 B2 | 2/2006 | Wai et al. | |

(Continued)

*Primary Examiner*—Nicholas Ponomarenko

(57) ABSTRACT

A reliable power supply solution for a telecommunications site provides a combined primary and backup source of electrical power. One system of the power supply solution includes one or more microturbine generators operable to produce AC electrical power as well as one or more rectifiers operable convert the AC electrical power from the one or more microturbine generators to DC electrical power for supply to a DC bus. A transfer switch is electrically coupled between one or more microturbine generators and the one or more rectifiers, for selecting between the AC electrical power of the microturbine generators and incoming AC electrical power to be supplied to the rectifiers. Additionally, one or more proton exchange membranes are provided in the system for producing DC electrical power. The aforementioned power generation and supply components are coupled with the DC bus for supplying DC electrical power to telecommunications equipment coupled with the DC bus.

7 Claims, 2 Drawing Sheets

U.S. PATENT DOCUMENTS

| | | |
|---|---|---|
| 7,081,687 B2 | 7/2006 | Johnson |
| 7,098,548 B2 | 8/2006 | Johnson |
| 7,112,891 B2 | 9/2006 | Johnson et al. |
| 7,157,803 B2 * | 1/2007 | Meyers et al. ............... 290/1 A |
| 7,240,492 B2 * | 7/2007 | Johnson ....................... 60/649 |
| 7,242,104 B1 * | 7/2007 | Johnson ....................... 290/1 A |
| 7,245,032 B2 * | 7/2007 | Willets et al. ............... 290/1 A |
| 7,245,034 B2 * | 7/2007 | Johnson ....................... 290/1 A |
| 7,256,506 B2 * | 8/2007 | Johnson ....................... 290/1 A |
| 7,298,053 B2 * | 11/2007 | Johnson et al. ............. 290/1 A |
| 7,370,666 B2 * | 5/2008 | Willets et al. ............ 137/487.5 |
| 2004/0094963 A1 * | 5/2004 | Johnson ......................... 290/2 |
| 2006/0016189 A1 * | 1/2006 | Johnson ....................... 60/651 |
| 2006/0038403 A1 * | 2/2006 | Johnson ....................... 290/1 A |
| 2006/0038533 A1 | 2/2006 | Johnson et al. |
| 2006/0049637 A1 * | 3/2006 | Johnson ....................... 290/1 R |
| 2006/0066105 A1 * | 3/2006 | Johnson et al. ............. 290/1 A |
| 2006/0071476 A1 * | 4/2006 | Johnson ....................... 290/1 A |
| 2006/0076780 A1 * | 4/2006 | Johnson ....................... 290/1 A |
| 2007/0057510 A1 * | 3/2007 | Meyers et al. ............... 290/1 A |
| 2008/0093929 A1 * | 4/2008 | Meyers et al. ................. 307/65 |
| 2008/0115496 A1 * | 5/2008 | Willets et al. ................. 60/734 |
| 2008/0115505 A1 * | 5/2008 | Willets et al. ................. 60/790 |

\* cited by examiner

POWER SYSTEM FOR A TELECOMMUNICATIONS SITE

CROSS-REFERENCE TO RELATED APPLICATIONS

This application is a continuation-in-part of and claims priority to U.S. application Ser. No. 11/132,013, filed May 18, 2005, and entitled "POWER SYSTEM WITH REFORMER", the teachings of which are incorporated herein by reference.

STATEMENT REGARDING FEDERALLY SPONSORED RESEARCH OR DEVELOPMENT

Not applicable.

BACKGROUND

Telecommunications service providers are increasingly concerned about maintaining reliable network connections for both voice and data transmissions. One particular area of concern is the maintenance of an adequate power supply at various sites along a telecommunications network in order to ensure telecommunication equipment and facilities housing such equipment are functioning properly. For instance, at a remotely located telecommunications facility, such as a wireless communication site (a "cell site") utilizing a base transceiver system (station), the loss of power from a commercial electric utility typically results in a "dead area" where no wireless communications are supported by the particular cell site. Even more critical is the maintenance of reliable and adequate power at a telecommunications exchange (switching office or system) or a point of presence server, since power loss would result in the disabling of one or more telephone switches or critical gateways to the Internet, thereby affecting large volumes of voice and/or data traffic.

Backup power supply for telecommunications network sites has traditionally been supplied through diesel generators and the like, or lead-acid batteries. There are many disadvantages, however, to each solution. Among other things, diesel generators often emit large amounts of pollution during operation, and are also prone to mechanical breakdown. Furthermore, such generators and the accompanying fuel storage device for supplying fuel take up significant amount of space per unit of power produced, making such devices unsuitable for use at telecommunications sites where space is critical. Lead-acid batteries also require significant maintenance over time, and may post a health and environmental hazard due to the corrosive gases produced by the batteries. Another drawback of lead-acid batteries is that such batteries suffer from a declining ability over time to hold a maximum amount of energy, which results in the useful lifespan of such batteries oftentimes being shorter than a rated lifespan for the batteries.

SUMMARY OF THE INVENTION

A reliable power supply solution for a telecommunications site is provided. In embodiments, the power supply solution serves as a combined primary and backup source of electrical power at either remote sites or power grid connected sites. Thus, multiple levels of redundancy are employed to ensure electrical power delivery to telecommunications equipment.

In one aspect, a power system of the present invention is configured for switching from incoming AC electrical power to backup power generation components. The system includes one or more microturbine generators operable to produce AC electrical power as well as one or more rectifiers operable convert the AC electrical power from the one or more microturbine generators to DC electrical power for supply to a DC bus. A transfer switch is electrically coupled between one or more microturbine generators and the one or more rectifiers, for selecting between the AC electrical power of the microturbine generators and incoming AC electrical power to be supplied to the rectifiers. Additionally, one or more proton exchange membranes are provided in the system for producing DC electrical power. The aforementioned power generation and supply components are coupled with the DC bus for supplying DC electrical power to telecommunications equipment coupled with the DC bus.

In another aspect, the power system of the present invention provides redundancy in power supply to the DC bus with which telecommunications equipment is electrically coupled by use of microturbine generators with certain proton exchange membrane (PEM) configurations. In particular, the power system includes one or more microturbine generators operable to produce AC electrical power as well as one or more rectifiers operable convert the AC electrical power from the one or more microturbine generators to DC electrical power for supply to a DC bus. Further, the system includes one or more of a first PEM configuration, where each first PEM is adapted to directly received hydrogen fuel from a hydrogen storage device, and one or more of a second PEM configuration, where each second PEM is membrane adapted to receive hydrogen fuel from a hydrogen reformer coupled with a fuel source.

Additional advantages and features of the invention will be set forth in part in a description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION

Embodiments of the present invention relate to power system for a telecommunications sites. One exemplary diagram of a simplified set of sites or facilities that handle voice and/or data traffic along a telecommunications network is provided in FIG. 1. Each of the types of facilities listed may employ the power system of the present invention. However, the system is particularly well suited for use at a central facility, as explained further herein.

Figure 1:
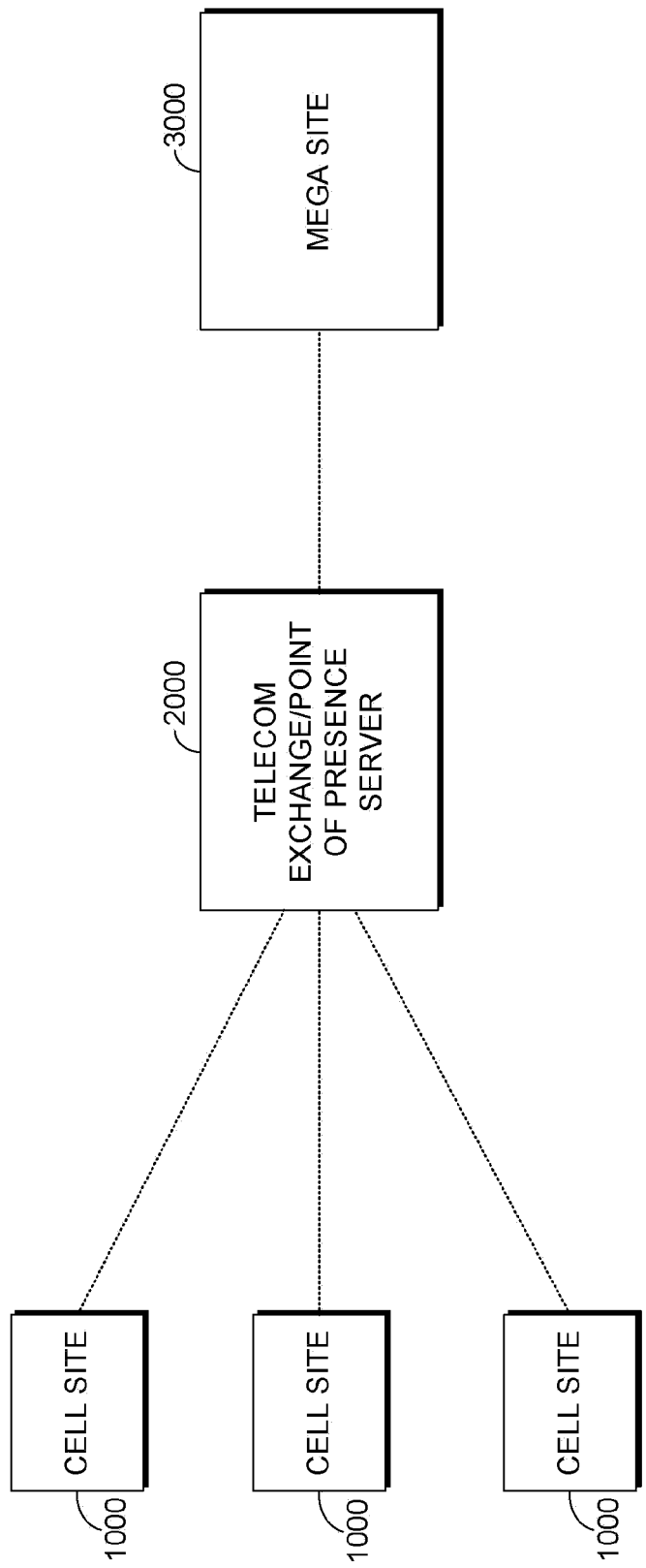
FIG. 1 is block diagram illustrating the general relationship between various portions of a telecommunications network.

With reference to FIG. 1, a plurality of cell site facilities 1000, or wireless communication facilities that each have a base transceiver system (BTS) are linked to a central facility 2000 serving as a telecommunications exchange (also referred to herein as a switching office or a network switching system) or a point of presence (POP) server. The cell site facilities 1000 combine to provide wireless communication coverage areas for mobile device users engaging in voice or data communications. The central facility 2000, as one example, carries out switching functions and manages communications activity between the mobile device users serviced by the cell sites 1000 and the public switched telephone network, or PSTN. Additionally, the central facility 2000 may act as a POP server to control access to the Internet by devices users serviced by the cell sites 1000, and may contain equipment for converting data signals to the proper protocol for such communications (e.g., TCP/IP). One or more central facilities 2000 may also be connected along a telecommunications network to a multiple systems operator, or mega site 3000. One example of a mega site 3000 is a facility that houses multiple telephone network switches and other equipment for managing telecommunications network traffic.

One conventional standard for powering individual phone lines in an analog telephone system is to provide 48 VDC to each line. This 48 VDC standard remains largely in place for telecommunications networks that interface with wired customer lines, despite the fact that digital transmission technology is utilized in the network. Accordingly, certain types of telecommunications equipment, such as a BTS, are designed to run on a supply of 48-54 VDC, the amount above 48 VDC taking into account voltage drop. The power system of the present invention includes power generating and storage components for supplying 54 VDC. In certain embodiments, the power system provides multiple 54 VDC components on one circuit to provide redundancy should one component either fail or expend the fuel supply to the component, or to act as a "bridge" to supply adequate electrical current during a startup phase of another component.

Figure 2:
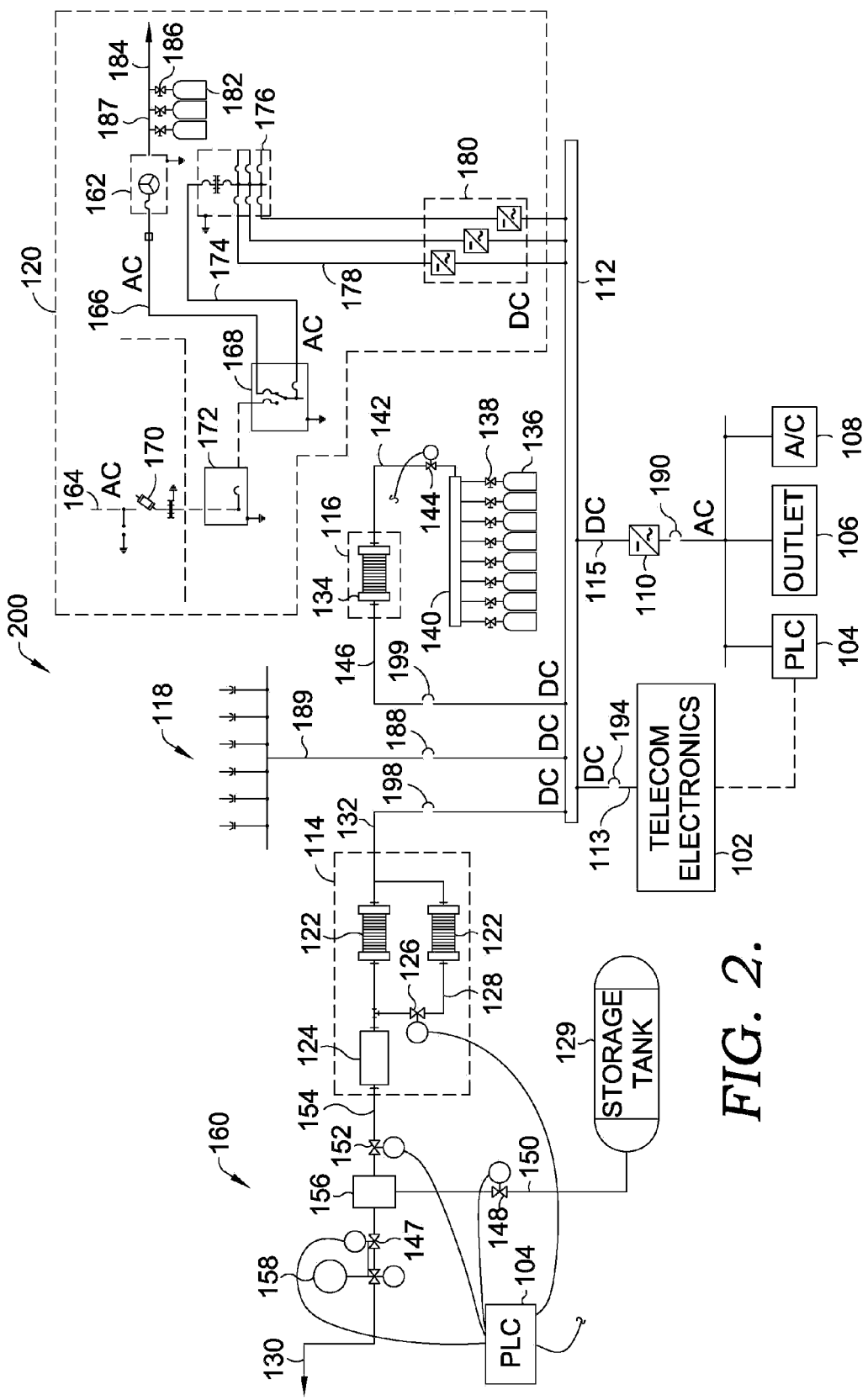
FIG. 2 is a schematic view of one embodiment of a system for providing DC electrical power at a telecommunications site.

Turning to FIG. 2, one embodiment of a power system or "power circuit" 100 is depicted for providing an uninterrupted, redundant power supply circuit utilized by telecommunication electronics 102 at a site, such as a cell site facility 1000 or central facility 2000, as examples. For instance, the system 100 may supply power for a control device in the form of a programmable logic controller (PLC) 104 or microprocessor (as a part of or electrically coupled with the electronics 102) managing the switching between power supply components of the system 100 during various modes of operation. Additionally, the system 100 supplies power to a power outlet 106 and to other facility devices, such as building air conditioning unit 108 for the facility where the system 100 is located. The electronics 102 runs off of DC electrical power, while an inverter 110 is provided in the portion of the circuit supplying power to the PLC 104, the power outlet 106 and the air conditioning unit 108 to provide these devices with AC electrical power. In one suitable configuration, the inverter 110 takes 54 VDC at input and outputs 240 VAC. For handling the interconnection between the various power generating/supplying components (as explained in more detail herein) and the power consuming/delivering components, such as the electronics 102, the PLC 104, power outlet 106 and air conditioning unit 108, the system 100 employs a DC bus 112. For instance, a copper bus may be employed that can handle up to 300 amps. The DC bus 112 ensures that a minimum amount (and desirably a constant amount) of electrical power is readily available for the power consuming/delivering components electrically connected with the bus 112. The electronics 102 are electrically coupled with the DC bus 112 through a conductive line 113, while inverter 110 is located in-line on a conductive line 115 that electrically couples the PLC 104, power outlet 106 and air conditioning unit 108 with the DC bus 112. It should be understood that the electronics 102 and the PLC 104 may be integrated together, if desired, so long as each component receives electrical power in the necessary form (i.e., AC or DC, as needed).

The power generating/supplying components of the system 100 electrically coupled with the DC bus 112 include a primary power source component 114, a secondary power source component 116, a capacitive device 118 and an AC to DC power supply subsystem 120. The primary power source component 114 includes one or more proton exchange membranes (PEM) 122 acting as fuel cells, as well as a hydrogen reformer 124 for supplying the PEM 122 with a supply of pressurized hydrogen gas realized from a hydrocarbon fuel supply. Specifically, the reformer 124 converts the hydrocarbons in the fuel source (propane or natural gas, as examples) to essentially pure hydrogen gas needed by the PEM 122. In the particular embodiment illustrated in FIG. 2, a pair of PEMs 122 are depicted in series with an in-line automated pressure-controlled valve 126 positioned in a fuel line 128 between the reformer 124 and one of the PEMs 122. The in-line valve 126, in this configuration, controls whether hydrogen gas is supplied to one or both of the PEMs 122 depending on the desired amount of electrical power to be generated and supplied to the DC bus 112 and to account for fluctuations in the electrical output of any one of the PEMs 122. The hydrocarbon-based fuel is supplied to the primary component 114 via one or more fuel storage tanks 129 or through a commercial utility pipeline 130. Ideally, the primary component 114 receives fuel from the pipeline 130 during normal operation. However, when this source is not available, the fuel storage tank 129 provides adequate fuel for operation of the reformer 124 and the PEMs 122 for a desired period of time. In one arrangement, the PEMs 122 each produce a 54 VDC output carried by conductive line 132 to the DC bus 112.

In a similar arrangement, the secondary power source component 116 utilizes one or more proton exchange membranes 134 acting as fuel cells coupled with a fuel source. However, the PEM 134 of the secondary component 116 receives hydrogen fuel directly from a set of high-pressure liquid hydrogen storage tanks 136, so no hydrogen reformer is needed. The rate of hydrogen flow from the tanks 136 is controlled using automated pressure-controlled valves 138, with one valve heading each of the storage tanks 136. Each valve 138 enables the corresponding storage tank 136 to be sealed off (e.g., when a tank needs to be removed for maintenance or refueling). Downstream from the valves 138 is a common manifold 140 to more or less provide equal pressures in the storage tanks 136 with corresponding valves 138 in the open position. Extending downstream from the manifold 140 is a fuel line 142 carrying the fuel source to the secondary component 116. An in-line automated pressure-controlled valve 144 is included in the fuel line 142 to selectively allow and disallow fuel flow from the storage tanks 136 to the secondary component 116 depending on whether it is desired to have the secondary component 116 in operation. Because the PEM 134 operates with gaseous hydrogen, the fuel line 142 and the environment surrounding the line 142 is of a configuration as to cause the liquid hydrogen from the storage tanks 136 to absorb thermal energy and undergo a phase change to a gaseous state within the line 142. Additionally, there may be a pressure drop through the valves 138 to aid in the hydrogen phase change. As with the primary component 114, the PEM 134 produces, in one arrangement, a 54 VDC output carried by conductive line 146 to the DC bus 112. One exemplary 54 VDC proton exchange membrane suitable for use in the primary component 114 and the secondary component 116 is a modular, cartridge-based, proton exchange membrane I-1000 power module manufactured by Reli-On, Inc. of Spokane, Wash.

It should be understood that the combination of the primary and secondary components 114 and 116, as well as the capacitive device 118 and power supply subsystem 120, as power generating/supplying components of the system 100, provides redundancy in power supply to the DC bus 112. Thus, when one of the components fails to supply adequate power to meet the electrical demand placed on the DC bus 112, another power generating/supplying component begins operation. In one exemplary configuration, the AC to DC power supply subsystem 120 provides a DC power supply during a normal operating mode for the telecom electronics 102 and other power consuming/delivering components, while the primary component 114 takes over supplying power when the subsystem 120 fails, and subsequently, the secondary component 116 (with bridging electrical power provided by the capacitive device 118) takes over supplying power when the primary component 114 fails. Accordingly, a valving and circuit breaker arrangement, as explained further herein, and under the control of the PLC 104 for instance, controls when fuel is supplied to the appropriate power generating component (e.g., primary and secondary components 114 and 116, AC to DC subsystem 120) and whether particular components are electrically coupled with the DC bus 112 to either draw current from or supply current to the bus 112. Thus, among other things, the PLC 104 controls the sequence of operation of various power generating/supplying components of the system 100, including the switching from one power generating component to another component (or between alternate fuel supplies of one particular component) when the fuel supply is not adequate to maintain normal operating conditions for the component in question.

The capacitive device 118 preferably includes a plurality of capacitors, which may be charged by an independent electrical power source, or in one arrangement, through the DC bus 112 during operation of the primary component 114, the secondary component 116, and/or the AC to DC subsystem 120. When switching power generation/supply modes from the AC to DC subsystem 120 to the primary component 114, or from the primary component 114 to the secondary component 116, there is a lag time (i.e., a start-up phase) before the respective PEMs 112 or 134 are fully operational and generating a peak power output. This lag time includes the amount of time necessary for valving controlling the flow of fuel from a supply source to open, the fuel to flow to the respective power generating component, and the component to reach a steady state operational phase and generate the required amount of electrical power. The capacitors 118 provide the electrical power needed during the lag time to keep up with the demand placed on the DC bus 112 by the power consuming components. Thus, ideally the capacitor arrangement has sufficient discharge time which is able to accommodate the longest of these possible delays. Another function of these capacitors is that they help smooth out the DC output of the PEMs 122 or 134 when more than one PEM is utilized in parallel with one another in the respective primary or secondary components 114 or 116 in operation. Commonly, the electrical output of whatever fuel cell is in use fluctuates. To make this DC output consistent, the capacitors fill in for any dips in electrical power providing a constant output level. One type of capacitor that is suitable for in system 100 is a super capacitor manufactured by Maxwell Technologies of San Diego, Calif. The particular number of capacitors 118 selected for use in the first system is dependant on the specific discharge and load requirements demanded by the power consuming components of the system 100.

The valve arrangement upstream of the reformer 124 of the primary component 114 includes a primary automated pressure-controlled valve 147 regulating the fuel flow through the pipeline 130 moving towards the reformer 124, a secondary in-line automated pressure-controlled valve 148 regulating the flow of fuel through a fuel line 150 receiving the stored fuel from the fuel storage tank 129, and a third in-line automated pressure-controlled valve 152 downstream of the primary and secondary valves 147 and 148 regulating the flow through the main supply fuel line 154 for the reformer 124. Interposed between all three valves (147, 148, and 152) at a T-junction between pipeline 130, fuel line 150 and fuel line 154 is a surge tank 156 for absorbing pressure irregularities and thus minimizing any disruptive effects created by the opening and closing of the valves 147, 148 and 152. Additionally, upstream of the primary valve 146, a utility meter and manual shut-off valve 158 integrated into the pipeline 130 allows for ceasing of the flow of fuel from the pipeline 130 to the primary component 114 without the need for the PLC 104 to control fuel flow from the pipeline 130 (i.e., without having to shutoff primary valve 147). The combination of the valves 147, 148 and 152 surrounding the surge tank 1256, and the tank 156 itself, is referred to herein as a fuel supply regulating mechanism 160.

The AC to DC power supply subsystem 120 provides AC electrical power by alternating between a microturbine 162 and an incoming utility power line 264. The electrical power output of the microturbine 162 is fed via a conductive line 166 to a high voltage transfer switch 168. The incoming utility power line 164 feeds electrical power past a fuse cut-out transformer 170 (e.g., for ensuring that utility power surges are not transmitted to the circuit formed by the system 100) to a main service entrance breaker 172 and onto the transfer switch 168. For instance, the incoming utility power may be three phase, 277/480 VAC power, while the power generated by the microturbine 162 may be three phase, 480 VAC power, as examples. The transfer switch 168 determines whether the DC bus 112 receives utility supplied power or alternatively power generated by the microturbine 162. The sequences of activity that are affected by the transfer switch 168, and involve carrying out the modes of operation of the system 100, are explained in more detail herein. Another conductive line 174 extends from the transfer switch 168 for carrying the supplied AC power from the switch 168 to a 480/280 VAC transformer panel board 176. In one arrangement, the transformer panel board 176 provides contact connections for three conductive lines 178 to connect therewith. The conductive lines 178 each carry a portion of the electrical current fed into the transformer panel board 176 from the conductive line 174. Located in-line on the conductive lines 178 is a rectifier 180 for converting the alternating current received from the transformer panel board 176 to direct current for supply to the DC bus 112.

The fuel supply for the microturbine 162 is a hydrocarbon-based fuel, such as natural gas or propane, provided via a set of high pressure storage tanks 182 or via a commercial utility pipeline 184. Valves 186 controlling the flow of fuel from the storage tanks 182 may be manually operated shut-off valves or automated pressure-controlled valves. The output of the valves 186 and the pipeline 184 both lead to a main supply fuel line 187 directly connected with the microturbine 162. The operation of these valves 184 may be controlled by the PLC 104. Alternatively, the fuel supply regulating mechanism 160 integrated upstream of the primary component 114 may be implemented with the fuel supply arrangement upstream of the microturbine 162.

Exemplary modes of operation of the system 100, under the control of the PLC 104 or other control device, are now described. It is contemplated that each power generating/supplying component may operate alone in supplying power to the DC bus 112 or in tandem with other components. For instance, under one set of rules, only a single power generating/supplying component is electrically connected with and supplying power to the DC bus 112 at any given point in time, as regulated by the breakers and/or switches present in the various conductive lines of the system 100. Alternatively, under another set of rules, some temporal overlap is allowed whereby an additional power generating/supplying component becomes electrically connected with the DC bus 112 during a startup phase of power generation for that additional component, ensuring that adequate electrical current is supplied to the DC bus 112. Under yet another set of rules, multiple power generating/supplying components electrically may be connected with and supplying power to the DC bus 112 at the same time, if a heavy load demand is placed on the DC bus 112 by the power consuming components of the system 100.

In a main operational mode, the AC to DC power supply subsystem 120 provides electrical power to the DC bus 112 without the need for any of the backup power generation components, such as the primary and secondary components 114 and 116. Accordingly, the main service entrance breaker 172 is closed and the transfer switch 168 is moved to a position whereby a circuit is closed between the power line 164 and the conductive line 174 output of the switch 168. This allows the input AC utility power to service the DC bus 112. Breakers 190 and 194, on conductive lines 115 and 113, respectively, are closed, enabling power to be consumed by the telecommunications electronics 102 and the PLC 104 and other power consuming components electrically coupled to the DC bus 112. Conversely, breakers 298, 299 and 288, on conductive lines 132, 146 and 189, respectively, are opened, to prevent current backflow from the bus 112 to the primary component 114, secondary component 116 and capacitors 118. Alternatively, the breaker 288 on conductive line 189 may be closed if it is desired to utilize the power supplied to the DC bus 112 by the utility power line 164 to charge the capacitors 118.

Upon the power line 164 ceasing to provide adequate electrical current, the transfer switch 168 is moved to a second position whereby a circuit is closed between the conductive line 166 carrying the electrical output of the microturbine 162 and the conductive line 174 output of the switch 168. Additionally, fuel is allowed to flow from either the pipeline 284, i.e., through the opening of upstream valves (not shown), or from the storage tanks 182 via opening of the valves 186, to the main supply fuel line 187 to enable operation of the microturbine 162.

A sequence of backup operational modes are entered by the system 100 once the microturbine 162 is unable to provide adequate electrical power to the DC bus 112 (e.g., because the pipeline 184 and storage tanks 182 no longer supply fuel for operation) and the power line 164 remains offline. Accordingly, the transfer switch 168 moves back to the position whereby a circuit is closed between the power line 164 and the conductive line 174, and if adequate electrical current is not sensed at the switch 168, the main service entrance breaker 172 is opened. At this point, the power line 164 and the microturbine 162 are both electrically disconnected from the DC bus 112, so that the AC to DC subsystem 120 is not able to supply electrical power.

In the first backup operational mode, breaker 188 in conductive line 189 is moved to the closed position, preferably prior to or simultaneous with the microturbine 162 completely ceasing operation and electrically disconnecting form the DC bus 112. This movement of the breaker 188 enables an uninterrupted supply of current to reach the bus 112 via the capacitors 118. Additionally, breaker 198 in conductive line 132 is closed concomitant with the PLC 104 opening the valves 147 and 152 to allow fuel to flow from the pipeline 130 to the surge tank 156 and onto the main supply fuel line 154. This enables the primary component 114 to utilize the fuel supply to generate DC electrical power carried by the conductive line 132 to the DC bus 112. Valve 126 may also be opened depending on the number of PEMs 122 desired for simultaneous operation. When the PLC 104 senses insufficient pressure through valve 147, the storage tank 129 is summoned to provide the fuel supply needed by the primary component 104. Specifically, valve 148 in fuel line 150 is opened immediately prior to valve 247 in the pipeline 130 being closed. This enables fuel to flow from the storage tank 129 to the reformer 124. It should be understood that both valves 147 and 150 may be opened simultaneously even when sufficient pressure is present through the pipeline 130, such as for smoothing out the volume of fuel delivery to the primary component 114 when fuel flow surges are present in the pipeline 130 which are not fully handled by the surge tank 156. Additionally, when the primary component 114 reaches steady stage operation and full power generation, the breaker 188 in conductive line 189 is opened because the capacitors 118 are no longer needed to supply the necessary electrical current to the DC bus 112.

Upon the primary component 114 failing to provide adequate electrical power to the DC bus 112, due to an insufficient supply of fuel or other issues, the breaker 188 in conductive line 189 is moved to the closed position. The movement of the breaker 188 is preferably prior to or simultaneous with the primary component 114 completely ceasing operation, enabling an uninterrupted supply of current to reach the bus 112 via the capacitors 118. Thereafter, breaker 198 in conductive line 132 is opened to electrically disconnect the primary component 114 from the DC bus 112. At this point, the second backup operational mode commences where.

Accordingly, in the second backup operational mode, breaker 199 in conductive line 146 is closed concomitant with the PLC 104 opening valve 144 and the particular valves 138 on the respective tanks 136 needed to adequately supply fuel to the secondary component 116. This allows the fuel from the tanks 136 having open valves to travel through the fuel line 142 to the PEM 134. The secondary component 116 is thus able to utilize the fuel supply to generate DC electrical power carried by the conductive line 146 to the DC bus 112. Thereafter, when the secondary component 116 reaches steady stage operation and full power generation, the breaker 188 in conductive line 189 is opened because the capacitors 118 are no longer needed to supply the necessary electrical current to the DC bus 112.

At any time during the backup operational modes, if electrical current flow from the utility power line 164 is sensed at the main service entrance breaker 172, the breaker 172 closes to complete a circuit between the power line 164 and the DC bus 112 through the breaker 172, transfer switch 168, and other components of the AC to DC subsystem 120. Thereafter, the respective valves allowing fuel to flow to the primary and/or secondary components 114 and 116 in operation are closed, and the respective breakers 198 and/or 199 are opened, to electrically disconnect such components from the DC bus 112. This returns the system 100 to the main operational mode.

As can be understood, the present invention provides a power supply solution for a telecommunications site, serving as a combined primary and backup source of electrical power at either remote sites or power grid connected sites. It should be understood that certain power generation and/or consumption elements depicted herein may be absent from the system 100 if desired, and that other combinations and subcombinations of elements are contemplated by the invention. For instance, the utility power line 164 may be removed from the system in situations where the telecommunications site is a remote site not connected to the power grid. In such a case, the microturbine 162 serves as the power generation component in the AC to DC power supply subsystem 120. Furthermore, it should be appreciated by people skilled in the art that the present invention is not limited to what has been particularly shown and described above. Rather, all matter shown in the accompanying drawings or described above is to be interpreted as illustrative and not limiting. Accordingly, the scope of the present invention is defined by the appended claims rather than the foregoing description.

What is claimed is:

1. A power system for a telecommunications site, comprising:
   at least one microturbine generator operable to produce AC electrical power,
   at least one rectifier operable to convert the AC electrical power from the at least one microturbine generator to DC electrical power,
   a transfer switch electrically coupled between the at least one microturbine and the at least one rectifier for selecting between the AC electrical power of the microturbine generator and incoming AC electrical power to be supplied to the at least one rectifier;
   at least one proton exchange membrane operable to produce DC electrical power; and
   a DC bus electrically coupled with the at least one rectifier and the at least one proton exchange membrane for supplying DC electrical power to telecommunications equipment at the telecommunications site.

2. The system of claim 1, further comprising an energy storage device electrically coupled with the DC bus for storing DC electrical power.

3. The system of claim 1, wherein the energy storage device comprises one or more super capacitors.

4. The system of claim 1, wherein the at least one proton exchange membrane comprises at least one first proton exchange membrane adapted to directly received hydrogen fuel from a hydrogen storage device, and at least one second proton exchange membrane adapted to receive hydrogen fuel from a hydrogen reformer coupled with a fuel storage device.

5. The system of claim 1, further comprising a hydrogen reformer coupled between the least one proton exchange membrane and a fuel source.

6. The system of claim 5, wherein the fuel source is provided by:
   a storage tank; and
   a utility fuel delivery line.

7. The system of claim 6, further comprising control means for selectively controlling the availability of fuel to the hydrogen reformer via the storage tank and the utility fuel delivery line.

* * * * *